Figure 1:
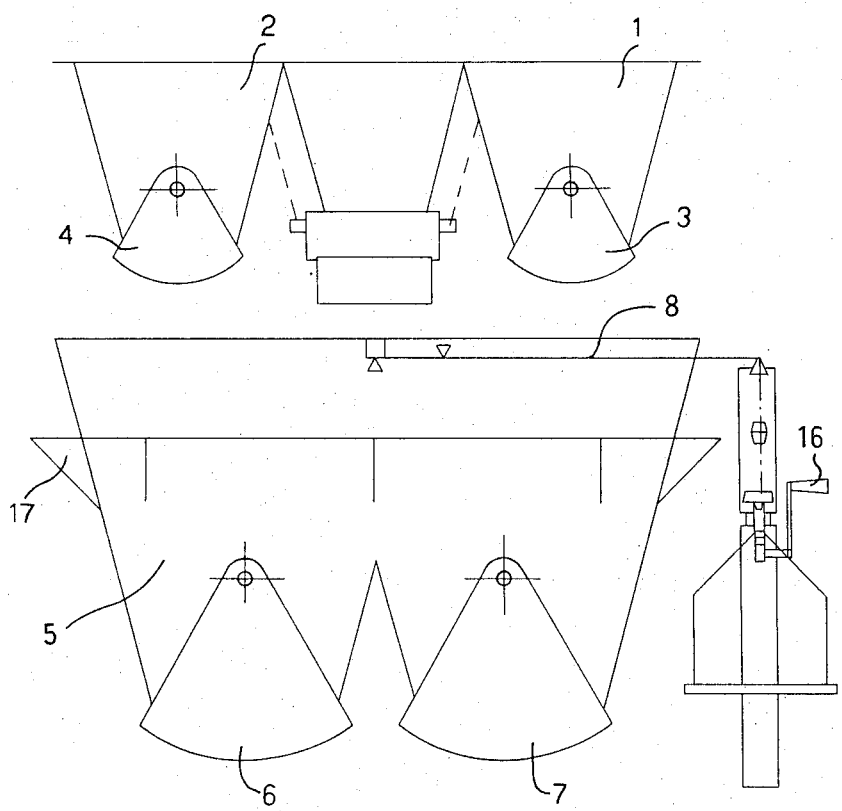

ic Patent Office 3,367,434
Patented Feb. 6, 1968

3,367,434
AUTOMATIC WEIGHING MACHINE
Johannes Lambertus Franciscus Maria Molenschot,
Teteringsedijk 52, Breda, Netherlands
Filed Feb. 26, 1965, Ser. No. 435,593
Claims priority, application Netherlands, Feb. 28, 1964,
64—1,974
3 Claims. (Cl. 177—50)

The invention relates to an automatic weighing machine, consisting of a weighing container coupled to a weighing apparatus and means adapted to be cut off for supplying the material to be weighed, whereby the weighing container is provided with one or more outlet flaps which, after a certain weight is reached and subsequently the supply is cut off, are automatically opened. Such an automatic weighing machine is known and serves for automatically weighing substantially powdery and/or granular material.

Such automatic weighing machines are generally used in transport systems where a weight control is considered necessary. The weighing apparatus being at the same time a shifting element, sees to the supply being cut off and the outlet flaps being opened as the exact weight in material is present in the weighing container.

Now it may happen that in the course of time the weighing apparatus will get out of adjustment, i.e. that deviations from the required load weight occur. However, controlling this is very complicated. For after the supply is cut off, the outlet flaps must be opened, the material received and thereafter transferred to a checking device. Obviously this results in quite some loss in time and the weighing cannot proceed as long as it is not ascertained by check-weighing whether the load weight is correct or not.

The object of the invention is to remove the abovementioned difficulties which is achieved by providing a checking device with the aid of which the material present in the container can be weighed with outlet flaps blocked.

This means that the material for the check-weighing need not be removed from the weighing container and that the check-weighing is done on the spot. Not only a saving of time is obtained by this but in addition the accuracy of the check is greater since there is no further risk of losing material during the transfer of the material to the check-weighing device.

According to one embodiment of the new construction an engaging mechanism is provided by means of which the weighing container can be coupled either to the weighing apparatus or to the checking device. In this latter instance the means by which the outlet flap or flaps of the weighing container are actuated, are blocked. So by a very simple operation a check-weighing can be carried out at any moment and without interrupting the weighing process whereas at the same time, if the load weight should prove to be inaccurate, the weighing apparatus can be corrected in a quick and efficient way.

The weighing container is preferably provided with a platform for receiving the weights for adjusting the weighing apparatus. For said weights so-called standard weights are used, which eventually could also be used for checking the weight of the material to be weighed.

Figure 2:
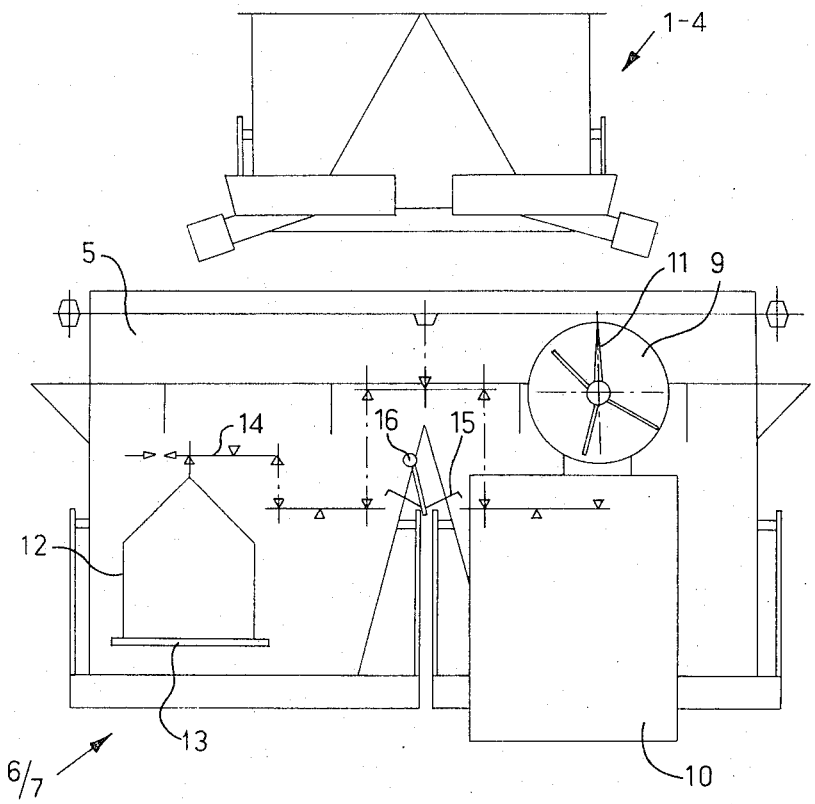

Now hereafter the invention will be discussed with the help of the drawing, in which:

FIG. 1 shows very schematically a front view of a weighing device according to the invention and FIG. 2 is a side-view thereof.

Drawn is the case in which the weighing device comprises a number of supply-bunkers 1 and 2 which at their bottoms are sealed by flaps 3 and 4. The weighing container proper is indicated by 5 and it is provided with one or more outlet flaps 6 and 7. The control of flaps 3, 4, respectively 6 and 7 is automatically achieved, which means that when the flaps 3 and 4 are opened the material to be weighed flows into the weighing container 5 and shortly before reaching the fixed weight, the flaps 3 and 4 will close but for a small aperture and in reaching the accurate weight the flaps 3 and 4 will definitely close. Simultaneously with the closing of the supply-flaps 3 and 4 or shortly after, the flaps 6 and 7 are automatically opened and the material will be removed from the weighing container 5. In the instance drawn, the weighing container is coupled to a weighing lever 8 which in a traditional way is connected to a weighing apparatus 9. This is represented very schematically in FIG. 2. The weighing device 9 operates automatically and is fixed to a base 10. When the weighing container 5 holds no material the hand 11 of the weighing device 9 points at zero. As soon as material is supplied the hand 11 will move along a graduated scale and the construction is such chosen now that at a determinate moment, corresponding with a certain load weight, the hand 11 or an element coupled to it controls an electrical contact, which in the way described causes the flaps 3 and 4 to close and the flaps 6 and 7 to open.

In addition to the automatic weighing devices 9 and 10 a checking device 12 is provided, which in its simplest form consists of a weighing platform 13 which through a lever system 14 can cooperate with a shifting mechanism 15, provided with a handle 16 controllable from the outside. In normal operation the weighing container 5 is coupled to the automatic weighing apparatus 9 and 10 by means of a weighing lever 8. FIG. 2 does not represent the lever system in full detail.

Now when performing a checking movement is required, the engaging mechanism 15 is such operated by means of the handle 16 that the automatic weighing device 9, 10 is disengaged, the weighing container 5 being coupled to the control-weighing device 12/13 by way of the weighing lever 8 and the system 14. When the load weight in the weighing container 5 corresponds with the check weight in the device 12/13, the weighing process may be proceeded with in the usual manner by changing over the mechanism 15, so throwing the automatic weighing apparatus 9/10 into operation again.

In case the load weight is inaccurate, the automatic weighing apparatus 9/10 should be adjusted. Then, emptying the weighing container 5 will be necessary. Said weighing container is provided with a platform 17 onto which standard weights in correspondence with the load to be weighed in the weighing container 5 can be placed. Now the adjustment of the automatic weighing apparatus 9/10 can be brought into line with the standard weights on the platform 17. Eventually said standard weights may be the same as those used in the checking device 12/13. However, if said checking device should be less easily accessible, a separate set of standard weights will be used to be placed onto the platform 17 for the purpose of checking and for adjustment of the automatic weighing apparatus 9/10.

Now when e.g. a wagon or a vessel is unloaded and the weight of the goods to be unloaded has been fixed in applying the invention, the rest which generally will not correspond with the load weight set, can also be read on the automatic weighing apparatus 9/10. The total weight can be determined by e.g. coupling the weighing apparatus to a counter, or by recording in any other way how many loads have been weighed. Then the rest can be added to the loads having been automatically counted or not.

I claim:
1. An automatic weighing machine comprising a weighing container, means for supplying a supply of material to said container to be weighed, a weighing apparatus coupled to said container, means for cutting off the supply of material to be weighed after a predetermined weight of material has been supplied to said container, said weighing container having an outlet flap, means for automatically opening said outlet flap after said predetermined weight is reached and the supply cut off, and a checking device cooperating with said container to weigh the material present in said weighing container when said outlet flap is closed.

2. An automatic weighing machine according to claim 1 wherein a switching-over mechanism is provided so that said weighing container can be coupled either to said weighing apparatus or to said checking device.

3. An automatic weighing machine according to claim 1 wherein said weighing container is provided with a platform for receiving weights for adjusting the weighing apparatus.

References Cited

UNITED STATES PATENTS

| | | | |
|---|---|---|---|
| 589,286 | 8/1897 | Richards | 177—66 |
| 862,940 | 8/1907 | Richardson | 177—66 |
| 1,072,018 | 9/1913 | McFarlane | 177—50 |
| 1,186,406 | 6/1916 | Kleiser | 177—66 |

RICHARD B. WILKINSON, *Primary Examiner.*

G. H. MILLER, Jr., *Assistant Examiner.*